(12) United States Patent
Hockin et al.

(10) Patent No.: US 9,477,516 B1
(45) Date of Patent: Oct. 25, 2016

(54) CONCURRENT IN-MEMORY DATA PUBLICATION AND STORAGE SYSTEM

(71) Applicant: Google Inc., Mountain View, CA (US)

(72) Inventors: Timothe Hockin, Sunnyvale, CA (US); Jakub Onufry Wojtaszczyk, Warsaw (PL); Jaroslaw Przybylowicz, Poznañ (PL); Erik Christian Haugen, Sunnyvale, CA (US); Xiaohui Chen, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 43 days.

(21) Appl. No.: 14/663,095

(22) Filed: Mar. 19, 2015

(51) Int. Cl.
  *G06F 12/02* (2006.01)
  *G06F 9/46* (2006.01)
  *G06F 12/14* (2006.01)

(52) U.S. Cl.
  CPC ............ *G06F 9/467* (2013.01); *G06F 12/023* (2013.01); *G06F 12/1475* (2013.01); *G06F 2212/1044* (2013.01); *G06F 2212/1052* (2013.01)

(58) Field of Classification Search
  CPC .. G06F 12/023; G06F 12/1465; G06F 9/467; G06F 2212/1044; G06F 2212/1052
  USPC .................. 711/170, 152, E12.002
  See application file for complete search history.

(56) References Cited

U.S. PATENT DOCUMENTS

| | | |
|---|---|---|
| 5,500,948 A | 3/1996 | Hinton et al. |
| 5,796,995 A | 8/1998 | Nasserbakht et al. |
| 5,815,420 A | 9/1998 | Steiss |
| 5,822,579 A | 10/1998 | Wichman |
| 5,864,697 A | 1/1999 | Shiell |
| 5,884,062 A | 3/1999 | Wichman et al. |
| 5,896,305 A | 4/1999 | Bosshart et al. |
| 5,940,311 A | 8/1999 | Dao et al. |
| 5,963,721 A | 10/1999 | Shiell et al. |
| 5,991,863 A | 11/1999 | Dao et al. |
| 6,009,516 A | 12/1999 | Steiss et al. |
| 6,119,222 A | 9/2000 | Shiell et al. |
| 6,128,687 A | 10/2000 | Dao et al. |
| 6,240,508 B1 * | 5/2001 | Brown, III .............. G06F 9/383 710/39 |

(Continued)

FOREIGN PATENT DOCUMENTS

| | | |
|---|---|---|
| EP | 91488 A1 | 10/1983 |
| EP | 398695 A2 | 11/1990 |

(Continued)

*Primary Examiner* — Pierre-Michel Bataille
(74) *Attorney, Agent, or Firm* — Honigman Miller Schwartz and Cohn LLP

(57) ABSTRACT

A method includes allocating a first memory location in a non-transitory data store in communication with a computing device and writing data to the first memory location when a first write transaction executes on the non-transitory data store. The method further includes executing one or more read transactions on the first memory location after completion of the first write transaction and incrementing a first pointer counter upon completion of the first write transaction and for each read transaction executing on the first memory location. The method allocates a second memory location in the non-transitory data store and writes updated data to the second memory location when a second write transaction executes on the non-transitory data store to update the data. The first pointer counter decrements and the second pointer counter increments upon completion of the second write transaction. The first memory location de-allocates when the first pointer counter is zero.

30 Claims, 14 Drawing Sheets

(56) References Cited

U.S. PATENT DOCUMENTS

| | | |
|---|---|---|
| 6,279,077 B1 | 8/2001 | Nasserbakht et al. |
| 6,357,020 B1 | 3/2002 | Bohizic et al. |
| 6,925,547 B2 | 8/2005 | Scott et al. |
| 7,107,367 B1 * | 9/2006 | Hughes .............. G06F 13/1673 711/170 |
| 7,484,073 B2 | 1/2009 | Cohen et al. |
| 7,680,987 B1 | 3/2010 | Clark et al. |
| 8,341,316 B2 | 12/2012 | Kaplan et al. |
| 8,452,942 B2 | 5/2013 | Slegel et al. |
| 8,549,204 B2 * | 10/2013 | Meyers .............. G06F 13/4226 710/17 |
| 9,043,363 B2 * | 5/2015 | Dragojevic ................ 711/147 |
| 2011/0219208 A1 | 9/2011 | Asaad et al. |
| 2012/0297167 A1 | 11/2012 | Shah et al. |
| 2013/0024647 A1 | 1/2013 | Gove |
| 2013/0275715 A1 | 10/2013 | Caprioli et al. |

FOREIGN PATENT DOCUMENTS

| | | |
|---|---|---|
| EP | 837390 A1 | 4/1998 |
| EP | 840207 A1 | 5/1998 |
| EP | 848323 A2 | 6/1998 |
| EP | 2425330 A1 | 3/2012 |
| EP | 2542973 A1 | 1/2013 |
| WO | WO-2014021995 A1 | 2/2014 |

\* cited by examiner

CONCURRENT IN-MEMORY DATA PUBLICATION AND STORAGE SYSTEM

TECHNICAL FIELD

This disclosure relates to data writes and data reads on a storage system.

BACKGROUND

Distributed storage systems store data within a non-transitory data store overlaying one or more memory locations. In some examples, the non-transitory data store includes one or more tables for arranging the data in the form of records and attributes for each record. A data store management system may execute write transactions to put data into the data store and execute read transactions where the data is queried and retrieved from the data store. Here, the writer atomically updates the data into the non-transitory data store in a single operation, and subsequent readers retrieve the atomically updated data. Atomic operations, however, often prevent readers from getting data from the data store while a writer is concurrently putting data into the data store, and vice versa. Thus, bottlenecking often results due to freezing one code path's access to the data in the data store while allowing another code path to access the data in the data store. In other examples, when write transactions execute during read transactions in progress, the data the reader gets is often a copy that is incomplete or inconsistent due to the intervening write transaction.

SUMMARY

One aspect of the disclosure provides a computing device in communication with a non-transitory data store that allocates a first memory location in the non-transitory data store and writes data to the first memory location when a first write transaction executes on the non-transitory data store. The computing device executes one or more read transactions on the first memory location after completion of the first write transaction and increments (e.g., atomically) a first pointer counter associated with the first memory location upon completion of the first write transaction and for each read transaction executing on the first memory location to get the data. The computing device allocates a second memory location in the non-transitory data store and writes updated data to the second memory location when a second write transaction executes on the non-transitory data store to update the data. Upon or after completion of the second write transaction, the computing device decrements the first pointer counter associated with the first memory location and increments a second pointer counter associated with the second memory location. The computing device de-allocates the first memory location when the first pointer counter associated with the first memory location decrements to zero.

Implementations of the disclosure may include one or more of the following optional features. In some implementations, the computing device blocks read access to a memory location when a pointer counter associated with the memory location is zero, wherein the pointer counter is zero when a write transaction executing on the associated memory location is in progress. In other implementations, the computing device blocks write access to a memory location upon executing a read transaction on the associated memory location to get data (e.g., using reader-writer mutual exclusion). The computing device may decrement a pointer counter associated with a memory location after completion of a read transaction on the associated memory location.

In some examples, when the second pointer counter associated with the second memory location is zero, the computing device executes one or more subsequent read transactions on the first memory location to get the data while the second write transaction concurrently executes on the second memory location. In other examples, the computing device executes one or more subsequent read transactions on the second memory location to get the updated data when the second pointer counter associated with the second memory location is greater than zero. The computing device may permit any read transactions executing on the first memory location in progress to complete when the first pointer counter associated with the first memory location is greater than zero after the second pointer counter associated with the second memory location increments. Optionally, when a remaining number of memory cycles until completion of the second write transaction is less than a memory cycle threshold, the computing device blocks one or more subsequent read transactions from executing on the first memory location to get the data and delays the one or more subsequent read transactions from executing on the second memory location to get the updated data until completion of the second write transaction. Optionally, when a third write transaction executes on the non-transitory data store to update the data after completion of the second write transaction, the computing device allocates a third memory location in the non-transitory data store and writes updated data to the third memory location. The computing device may decrement the second pointer counter associated with the second memory location and increment a third pointer counter associated with the third memory location upon completion of the third write transaction. In some examples, the computing device de-allocates the second memory location when the second pointer counter associated with the second memory location decrements to zero.

In some implementations, the computing device initializes a pointer counter associated with memory location upon allocating the associated memory location. The computing device may increment a pointer counter associated with a memory location for each read transaction executing on the associated memory location. Optionally, the computing device executes a write transaction on the non-transitory data store when the computing device receives a write access request from an application programming interface executing on a user device. Optionally, the computing device executes a read transaction on the non-transitory data store when the computing device receives a read access request from an application programming interface executing on a user device. In some examples, the non-transitory data store includes a hierarchal structure for storing the data, the data including strongly-typed data.

Another aspect of the disclosure provides a remote system that includes a non-transitory data store and a data processing device in communication with the non-transitory data store that allocates a first memory location in the non-transitory data store and writes data to the first memory location. The data processing device executes on or more read transactions on the first memory location after completion of the first write transaction and increments a first pointer counter associated with the first memory location upon completion of the first write transaction and for each read transaction executing on the first memory location to get the data. The data processing device allocates a second memory location in the non-transitory data store and writes updated data to the second memory location when a second write transaction executes on the non-transitory data store to update the data. The data processing device decrements the first pointer counter associated with the first memory location and increments a second pointer counter associated with the second memory location upon completion of the second write transaction. The data processing device further de-allocates the first memory location when the first pointer counter associated with the first memory location decrements to zero.

This aspect may include one or more of the following optional features. In some implementations, the data processing device blocks read access to a memory location when a pointer counter associated with the memory location is zero, wherein the pointer counter is zero when a write transaction executing on the associated memory location is in progress. In other implementations, the data processing device blocks write access to a memory location upon executing a read transaction on the associated memory location to get data. The data processing device may decrement a pointer counter associated with a memory location after completion of a read transaction on the associated memory location.

In some examples, when the second pointer counter associated with the second memory location is zero, the data processing device executes one or more subsequent read transactions on the first memory location to get the data while the second write transaction concurrently executes on the second memory location. In other examples, the data processing device executes one or more subsequent read transactions on the second memory location to get the updated data when the second pointer counter associated with the second memory location is greater than zero. The data processing device may permit any read transactions executing on the first memory location in progress to complete when the first pointer counter associated with the first memory location is greater than zero after the second pointer counter associated with the second memory location increments. Optionally, when a remaining number of memory cycles until completion of the second write transaction is less than a memory cycle threshold, the data processing device blocks one or more subsequent read transactions from executing on the first memory location to get the data and delays the one or more subsequent read transactions from executing on the second memory location to get the updated data until completion of the second write transaction. Optionally, when a third write transaction executes on the non-transitory data store to update the data after completion of the second write transaction, the data processing device allocates a third memory location in the non-transitory data store and writes updated data to the third memory location. The data processing device may decrement the second pointer counter associated with the second memory location and increment a third pointer counter associated with the third memory location upon completion of the third write transaction. In some examples, the data processing device de-allocates the second memory location when the second pointer counter associated with the second memory location decrements to zero.

In some implementations, the data processing device initializes a pointer counter associated with memory location upon allocating the associated memory location. The data processing device may increment a pointer counter associated with a memory location for each read transaction executing on the associated memory location. Optionally, the data processing device executes a write transaction on the non-transitory data store when the data processing device receives a write access request from an application programming interface executing on a user device. Optionally, the data processing device executes a read transaction on the non-transitory data store when the data processing device receives a read access request from an application programming interface executing on a user device. In some examples, the non-transitory data store includes a hierarchal structure for storing the data, the data including strongly-typed data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
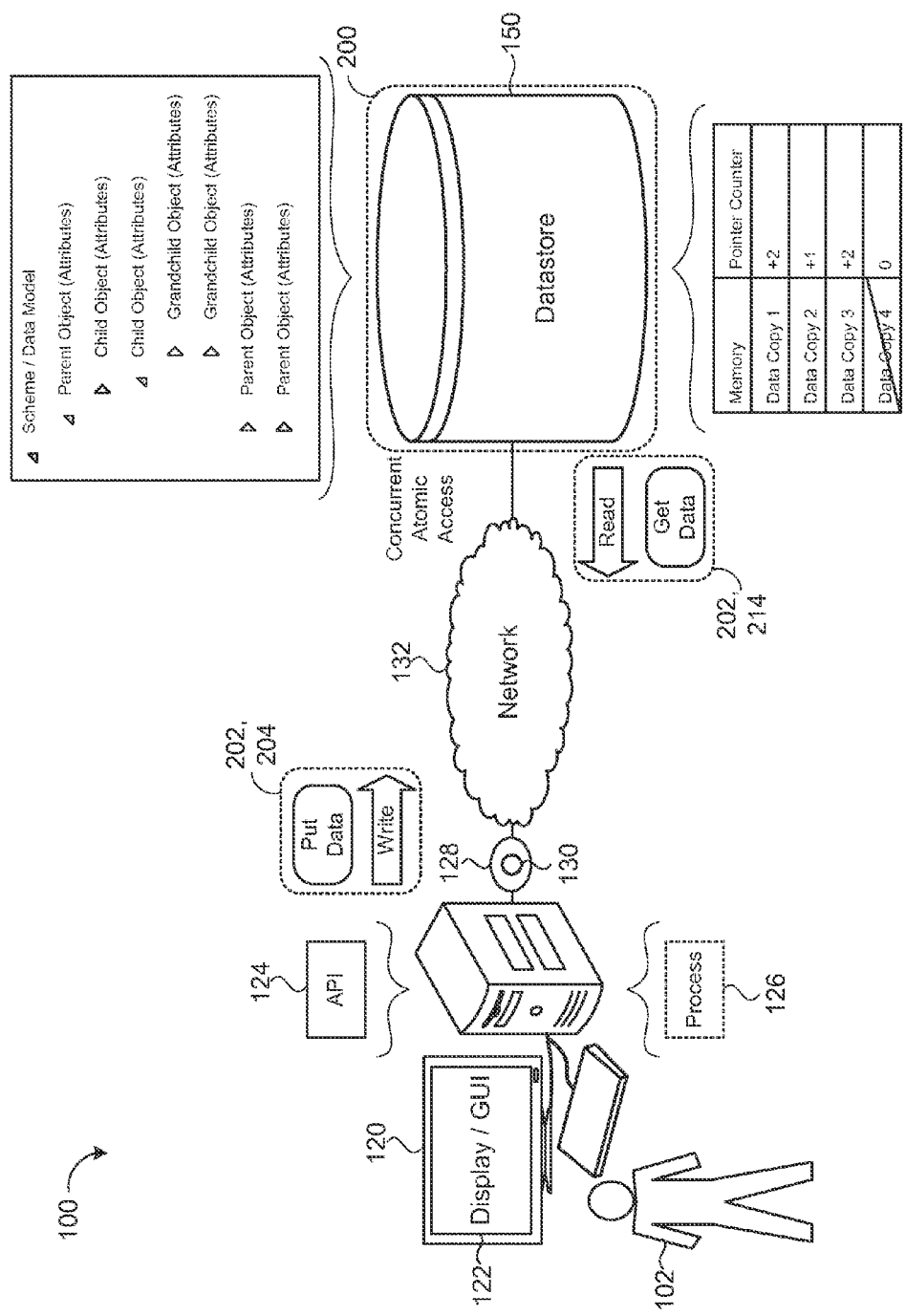
FIG. 1 is a schematic view of an example system for providing a user device concurrent atomic access to a non-transitory data store.
Figure 2:
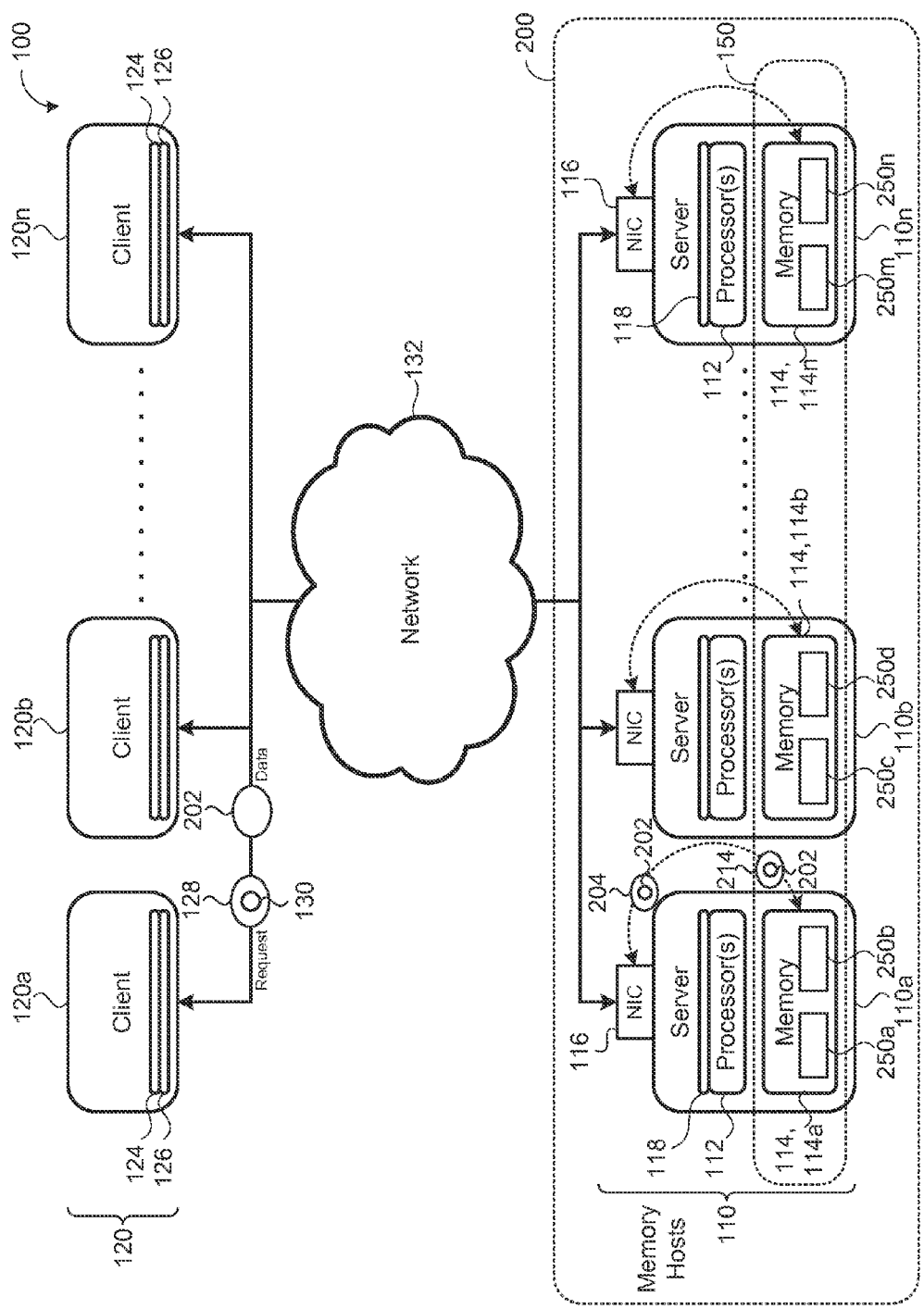
FIG. 2 is a schematic view of an example system for providing one or more user devices atomic access to a non-transitory data store of a distributed storage system.

Referring to FIGS. 1 and 2, in some implementations, a system 100 includes one or more user devices 120a-n associated with a user 102. The user devices 120 are in communication, via a network 132, with a distributed storage system 200 having a scalable/elastic non-transitory data store 150. In some implementations, the distributed storage system 200 executes a computing device 112 that manages access to the non-transitory data store 150. User devices 120 may put data 202 into the non-transitory data store 150 when the computing device 112 executes write transactions 204 and may get the data 202 from the non-transitory data store 150 when the computing device 112 executes read transactions 214. As used herein, putting data 202 into the non-transitory data store 150 refers to writing data 202 to the non-transitory data store 150 and getting the data 202 from the non-transitory data store 150 refers to reading the data 202 stored in the non-transitory data store 150. In some examples, the computing device 112 executes write transactions 204 when the computing device 112 receives a write access request 128 from a user device 120 via the network 132. Likewise, the computing device 112 may execute read transactions 214 when the computing device 112 receives a read access request 140 from a user device 120 via the network 132.

The user devices 120 can be any computing devices that are capable of communicating with the computing device 112 through the network 132. User devices 120 include, but are not limited to, desktop computing devices and mobile computing devices, such as laptops, tablets, smart phones, and wearable computing devices (e.g., headsets and/or watches). The user devices 120 may further execute a graphical user interface (GUI) 222 on a display 122 to write data 202 to the non-transitory data store 150 and/or and read data 202 from the non-transitory data store 150 of the distributed storage system 200.

In some implementations, the user devices 120 execute a transaction application programming interface (API) 124 that is responsible for accessing the underlying data 202, for example, putting data 202 into the non-transitory data store 150 and/or getting data 202 from the non-transitory data store 150. The transaction API 124 translates commands, such as look-up or insert data commands, into sequences of primitive network interface controller operations. The transaction API 124 interfaces with the user devices 120 and the non-transitory data store 150 of the distributed storage system 200. In some implementations, the transaction API 124 enables user devices 120 to use Structured Query Language (SQL) to query data 202 stored in the non-transitory data store 150 and write updated data 202 such as indexes into the non-transitory data store 150 for faster querying to increase the efficiency of the non-transitory data store 150 even when the amount of stored data 202 increases over time.

The network 132 may include various types of networks, such as local area network (LAN), wide area network (WAN), and/or the Internet. Although the network 132 may represent a long range network (e.g., Internet or WAN), in some implementations, the network 132 includes a shorter range network, such as a local area network (LAN). In some implementations, the network 132 uses standard communications technologies and/or protocols. Thus, the network 132 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 132 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 132 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 132 uses custom and/or dedicated data communications technologies instead of, or in addition to, the ones described above.

In some implementations, the non-transitory data store 150 stores data 202 as a collection of attributes/tables each contributing a set of columns and rows. Each column may include pertinent records and each row may include the data 202. In some examples, relationships are added between tables to indicate that two sets of data 202 are inter-related. In some implementations, the non-transitory data store 150 is a relational database. In the example shown, the non-transitory data store 150 includes a schema defining a supported language and utilized to set integrity constraints such that the data 202 is strongly-typed and arranged in a hierarchical structure in a manner similar to a file system.

For example, attributes of a parent object includes a plurality of child objects, each child object having attributes including a plurality of grandchild objects, and so on. Requiring the data 202 to be strongly-typed enforces strict restrictions on intermixing values with different data 202 types when executing write and read transactions 204, 214, respectively. Values of strongly-typed data 202 can include STRING, INT, VARCHAR, CBLOB, DECIMAL, etc. In one example, a type person would include a STRING for the person's name and an INT for the person's age. Using strongly typed data for the data store 150 allows for compound structures beyond primitives, and is exposed to the consumer through an application programming interface (API) in the form of language-native types. For example, a C++ implementation of the API accepts as input and returns as output arbitrary C++ types, without knowing what those types are.

Referring to FIG. 2, in some implementations, the distributed storage system 200 includes loosely coupled memory hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. The non-transitory data store 150 (e.g., a storage abstraction) overlain on the storage resources 114 allows scalable use of the storage resources 114 by one or more user devices 120, 120a-n. The user devices 120 may communicate with the memory hosts 110 through the network 132 (e.g., via remote procedure calls (RPC)).

In some implementations, the distributed storage system 200 is "single-sided," eliminating the need for any server jobs for responding to RPC from user devices 120 to write data 202 when executing the write transaction 204 or read data 202 when executing the read transaction 214 on their corresponding memory hosts 110 and may rely on specialized hardware to process remote write and read access requests 128, 130, respectively, instead. "Single-sided" refers to the method by which most of the request processing on the memory hosts 110 may be done in hardware rather than by software executed on CPUs 112 of the memory hosts 110. Rather than having a processor 112 of a memory host 110 (e.g., a server) execute a server process 118 that exports access of the corresponding storage resource 114 (e.g., non-transitory memory) to user processes 126 executing on the user devices 120, the user devices 120 may directly access the storage resource 114 through a network interface controller (NIC) 116 of the memory host 110. In other words, a user process 126 executing on a user device 120 may directly interface with one or more storage resources 114 without requiring execution of a routine of any server processes 118 executing on the computing resources 112. This single-sided distributed storage architecture offers relatively high-throughput and low latency, since user devices 120 can access the storage resources 114 of the non-transitory data store 150 without interfacing with the computing resources 112 of the memory hosts 110. This has the effect of decoupling the requirements for storage 114 and CPU 112 cycles that typical two-sided distributed storage systems 200 carry. The single-sided distributed storage system 200 can utilize remote storage resources 114 regardless of whether there are spare CPU 112 cycles on that memory host 110; furthermore, since single-sided operations do not contend for server CPU 112 resources, a single-sided system 200 can serve cache requests 128, 130 with very predictable, low latency, even when memory hosts 110 are running at high CPU 112 utilization. Thus, the single-sided distributed storage system 200 allows higher utilization of both cluster storage 114 and CPU resources 112 than traditional two-sided systems, while delivering predictable, low latency.

The distributed storage system 200 may put data 202 in dynamic random access memory (DRAM) 114 (e.g., the non-transitory data store 150) and get the data 202 from the remote memory hosts 110 via remote direct memory access (RDMA)-capable network interface controllers (NIC) 116. A network interface controller 116 (also known as a network interface card, network adapter, or LAN adapter) may be a computer hardware component that connects a computing device/resource 112 to the network 132. Both the memory hosts 110a-n and the user device 120 may each have a network interface controller 116 for network communications. A host process 118 executing on the computing processor 112 of the memory host 110 may allocate a memory location 250a-n when executing a write transaction 204 to write updated data 202; furthermore, the host process 118 may de-allocate a memory location 250a-n storing data 202 when no read transactions 214 are currently executing on the memory location 250a-n and the write transaction 204 completes the write of the updated data 202 to the allocated memory location 250a-n.

The distributed storage system 200 may include a co-located software process to register memory 114 for remote access with the network interface controllers 116 and set up connections with user processes 126. Once the connections are set up, user processes 126 can access the registered memory 114 via engines in the hardware of the network interface controllers 116 without any involvement from software on the local CPUs 112 of the corresponding memory hosts 110.

In some implementations, the distributed storage system 200 enables concurrent atomic access to the non-transitory data store 150 a read transaction 212 executing on a first memory location 250a to get data 202 without preventing a write transaction 214 from executing on a second memory location 252b to put updated data 202 while the read transaction 214 is executing concurrently. Accordingly, concurrent atomic access to the non-transitory data store 150 avoids delays since a read transaction 214 will not be blocked from executing on the non-transitory data store 150 to get data 202 while a write transaction 212 executes on the non-transitory data store 150 to put updated data 202, and vice versa. In some examples, the first and second memory locations 250a-b are isolated from one another such that read access to the first memory location 250a is permitted for getting data 202 while write access to the first memory location 250a for putting updated data 202 is blocked. Similarly, write access to the second memory location 250b is permitted for putting the updated data 202 while read access to the second memory location 250b for getting the updated data 202 is blocked until completion of the underlying write transaction 212. In other words, the concurrent atomic access facilitates write transactions 204 to never write data to memory locations 250 once read access is permitted thereto; and read transactions 214 will never get updated data 202 from a memory location 250 until completion of a corresponding write transaction 204 executing thereon. Thus, read transactions 214 will never get/read data 202 that is incomplete while a write transaction 204 executes concurrently.

The computing device 112 holds one or more pointer counters associated with memory locations 250a-n within the non-transitory data store 150. In some implementations, when the computing device 112 allocates a first memory location 250a for putting data 202 when a write transaction 204 executes, a first pointer counter associated with the first memory location 250a is initialized by the computing device 112. The first pointer counter includes a value of zero while the write transaction 204 executing on the first memory location 250a is in progress. In some examples, when the first pointer counter associated with the first memory location 250 is zero upon initializing the first memory location 250a, the computing device 112 blocks read access to the first memory location 250a. After completion of the write transaction 204, the computing device 112 may increment the first pointer counter associated with the first memory location 205. Once the first pointer counter associated with the first memory location 250a is incremented, i.e., the first pointer counter is greater than zero, the computing device 112 may permit read access to the first memory location 250a to get the data. In some implementations, the computing device 112 increments the first pointer counter associated with the first memory location 250a for each read transaction 214 executing on the first memory location 250a to get the data 202.

In some implementations, when the computing device 112 executes a second write transaction 204 on the non-transitory data store 150 to update the data 202, the computing device 112 allocates a second memory location 250b for putting updated data 202 and initializes a second pointer counter associated with the second memory location 250b. In some examples, upon completion of the second write transaction 204, the computing device 112 decrements the first pointer counter associated with the first memory location 250a and increments the second pointer counter associated with the second memory location 250b. In some examples, when the first pointer counter associated with the first memory location 250a decrements to zero, the computing device de-allocates the first memory location 250a. The computing device 112 operates recursively, whereat the computing device 112 will accordingly allocate and de-allocate third, fourth, . . . $n^{th}$ memory locations 250a-n, and increment and decrement associated pointer counters 260a-n, as data 202 within the non-transitory data store 150 is continuously updated.

Figure 3A:
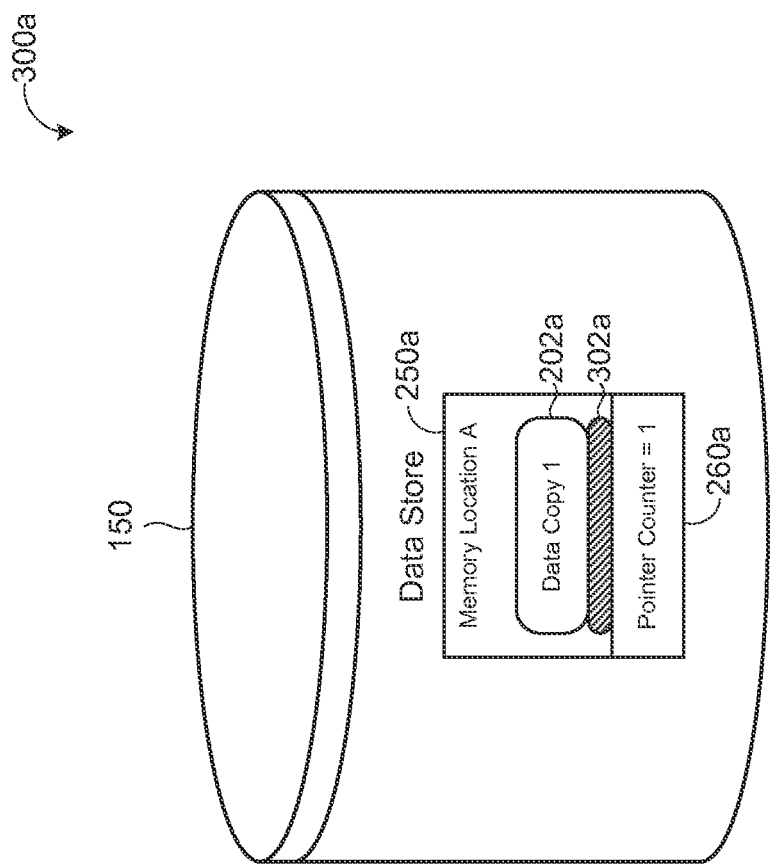
FIGS. 3A-3H show schematic views of example write and read transactions executing on an example non-transitory data store.

FIGS. 3A-3H show schematic views 300a-h of example write and read transactions 204, 214, respectively, executing on an example non-transitory data store 150. FIG. 3A shows the non-transitory data store 150 including a first memory location ("Memory Location A") 250a that stores a first copy of data ("Data Copy 1") 202a. A first pointer counter 260a associated with the first memory location 250a is one indicating that no write transaction 204 is currently executing on the first memory location 250a and read access to the first memory location 250a is permissible. A status indicator 302a associated with the first memory location 250a indicates the data 202a is a complete copy.

Figure 3B:
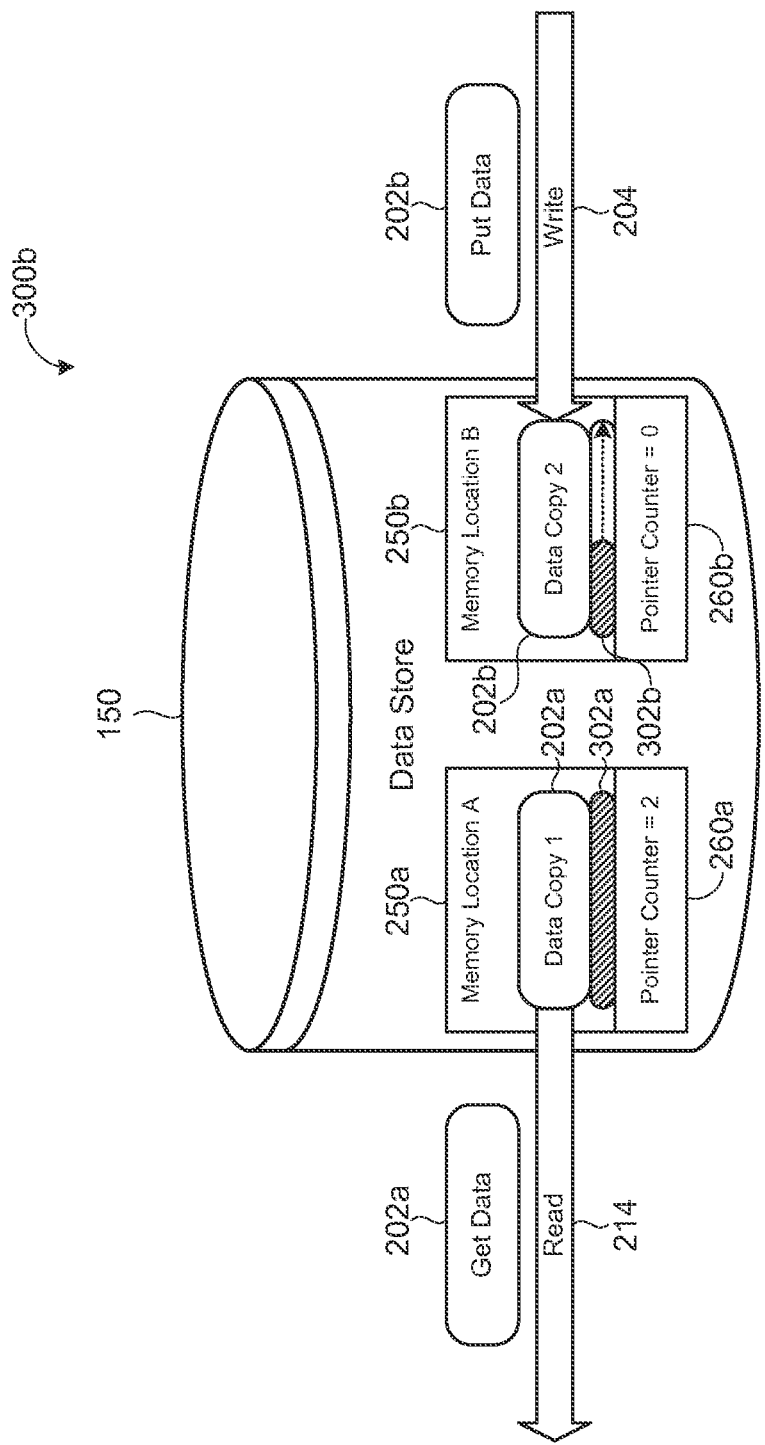

Referring to FIG. 3B, a read transaction 214 executes on the first memory location 250a to get data 202. The first pointer counter 260a associated with the first memory location 250a is incremented for the executing read transaction 214. In the example shown, the first pointer counter 260a is two. While the read transaction 214 executes on the first memory location 250a, the computing device 112 allocates a second memory location ("Memory Location B") 250b when a write transaction 204 executes to write an updated copy of the data ("Data Copy 2") 202b to the non-transitory data store 150, i.e., via the second memory location 250b. Upon or after executing the write transaction 204 on the second memory location 250b, the computing device 112 initializes a second pointer counter 260b associated with the second memory location. In the example shown, the second pointer counter 260b is zero indicating the write transaction 204 is currently executing on the second memory location 250b and the computing device 112 is blocking read access to the second memory location 250b. Furthermore, the status indicator 3020b associated with the second memory location 250b indicates only about half the updated data 202b is put into the second memory location 250b. More specifically, the status indicator 302b indicates a remaining number of memory cycles until completion of the underlying write transaction 204 executing on the second memory location 250b.

Figure 3C:
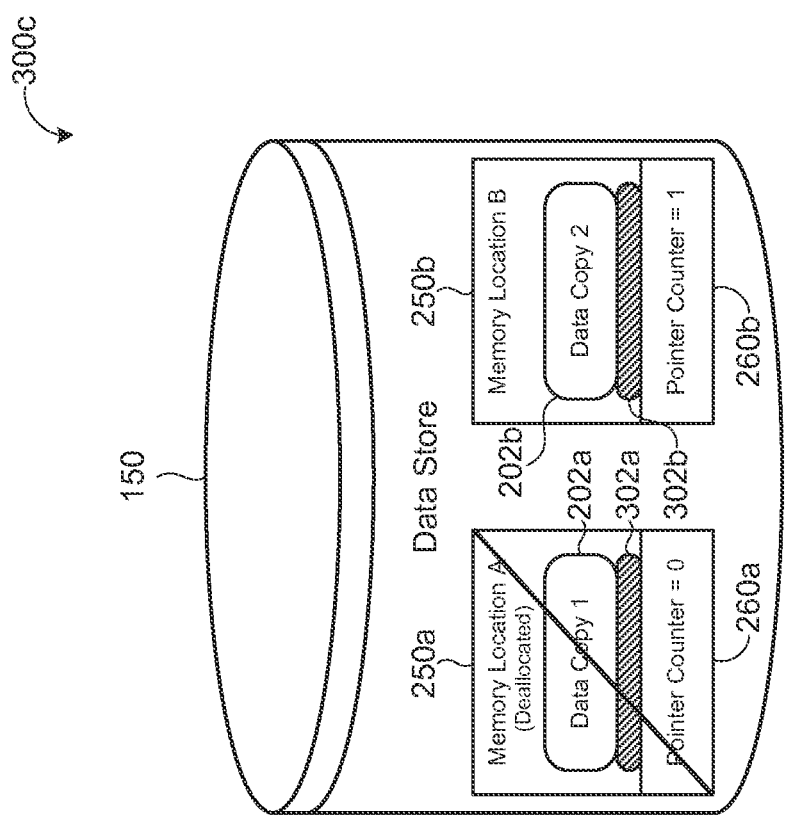

FIG. 3C shows completion of the write transaction 204 that previously executed on the second memory location 250b in FIG. 3B. In the example shown, the second pointer counter 260b associated with the second memory location 250b is incremented from zero to one upon completion of the write transaction 204 and the status indicator 302b indicates the copy of the updated data 202b is complete; furthermore, the first pointer counter 260a associated with the first memory location 250a is decremented upon completion of write transaction 204 on the second memory location 250b. In the example shown, the first pointer counter 260a is also decremented after the read transaction 214 that previously executed on the first memory location 250a in FIG. 3B completes. Accordingly, the first memory location 250a is de-allocated when the first pointer counter 260 decrements to zero.

Figure 3D:
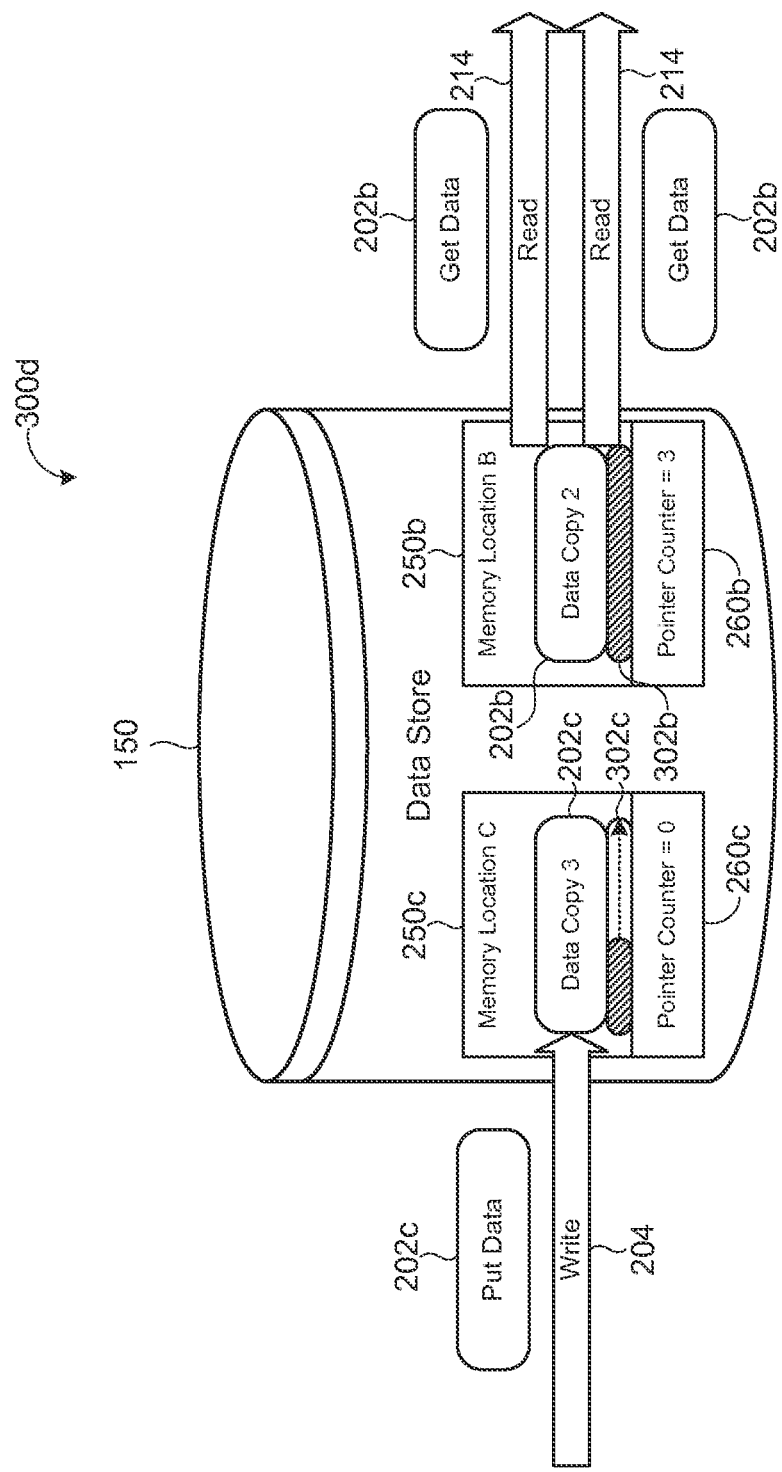

Referring to FIG. 3D, two read transactions 214 execute on the second memory location 250b to get data 202b corresponding to the updated copy of data ("Data Copy 2") 202b put into the second memory location 250b by the write transaction 204 illustrated in FIG. 3C. The second pointer counter 260b associated with the second memory location 250a is incremented for each one of the executing read transactions 214. In the example shown, the second pointer counter 260b is three. While the two read transactions 214 execute on the second memory location 250b, the computing device 112 allocates a third memory location ("Memory Location C") 250c when a write transaction 204 executes to write a subsequent updated copy of the data ("Data Copy 3") 202c to the non-transitory data store 150, i.e., via the third memory location 250c, whereat the computing device 112 initializes a third pointer counter 260c associated with the third memory location 250c. In the example shown, the third pointer counter 260c is zero indicating the write transaction 204 is currently executing on the third memory location 250c and the computing device 112 is blocking read access to the third memory location 250c. Furthermore, the status indicator 302c associated with the third memory location 250c indicates only about half the subsequent updated data 202c is put into the third memory location 250c. More specifically, the status indicator 302c indicates a remaining number of memory cycles until completion of the underlying write transaction 204 executing on the third memory location 250c.

Figure 3E:
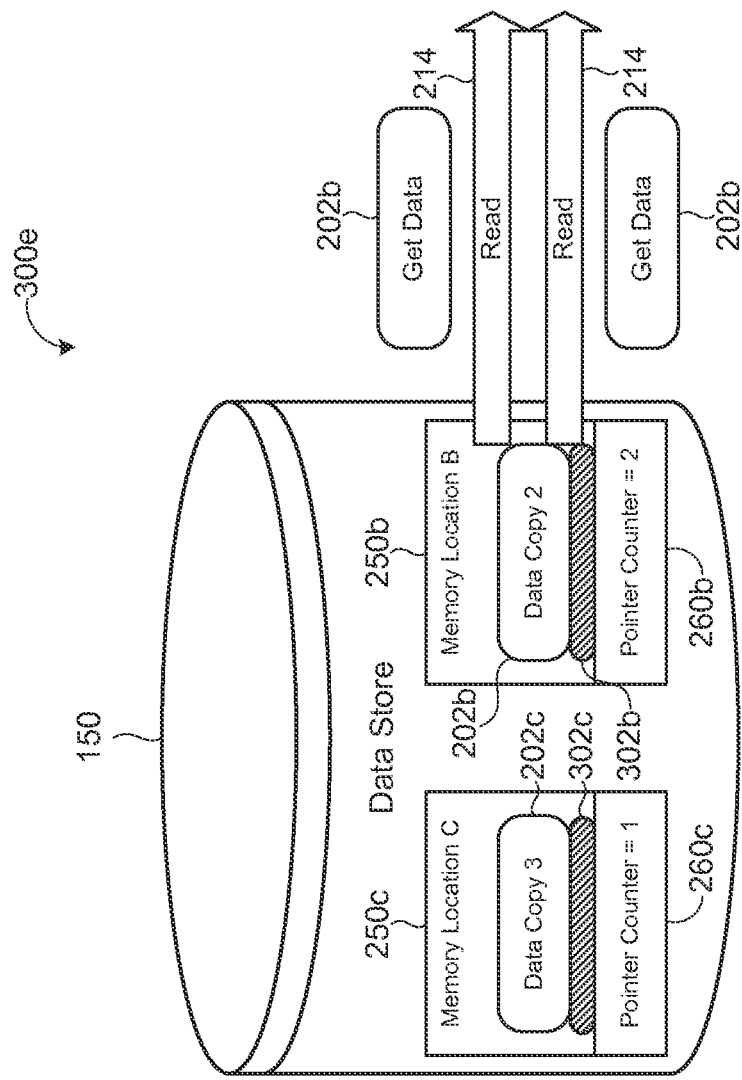
Figure 3F:
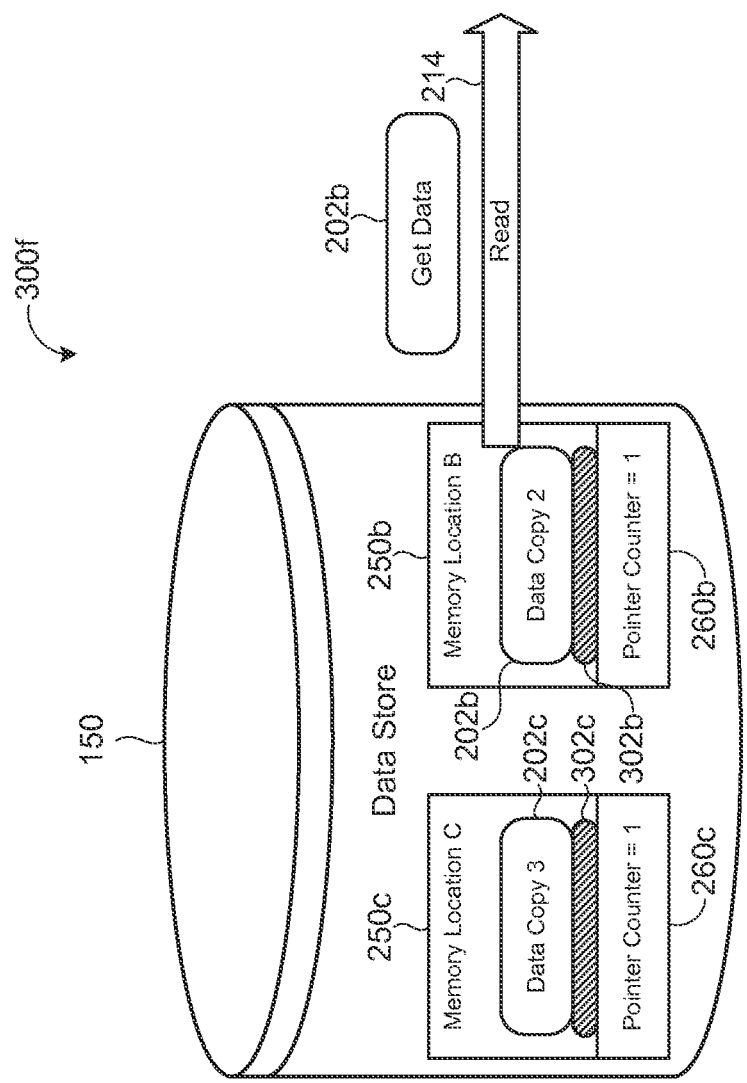

FIG. 3E shows the completion of the write transaction 204 that previously executed on the third memory location 250c in FIG. 3D. In the example shown, the third pointer counter 260c associated with the third memory location 250c is incremented from zero to one upon completion of the write transaction 204 and the status indicator 302c indicates the copy of the subsequent updated data 202c is complete; furthermore, the second pointer counter 260b associated with the second memory location 250a is decremented upon completion of write transaction 204 on the third memory location 250c. The second pointer counter 260b associated with the second memory location is two while each of the two read transactions 204 executing on the second memory location 250b are still in progress. Referring to FIG. 3F, the second pointer counter 260b associated with the second memory location 250b is decremented to one after completion of one of the read transactions 204 on the second memory location 250b.

Figure 3G:
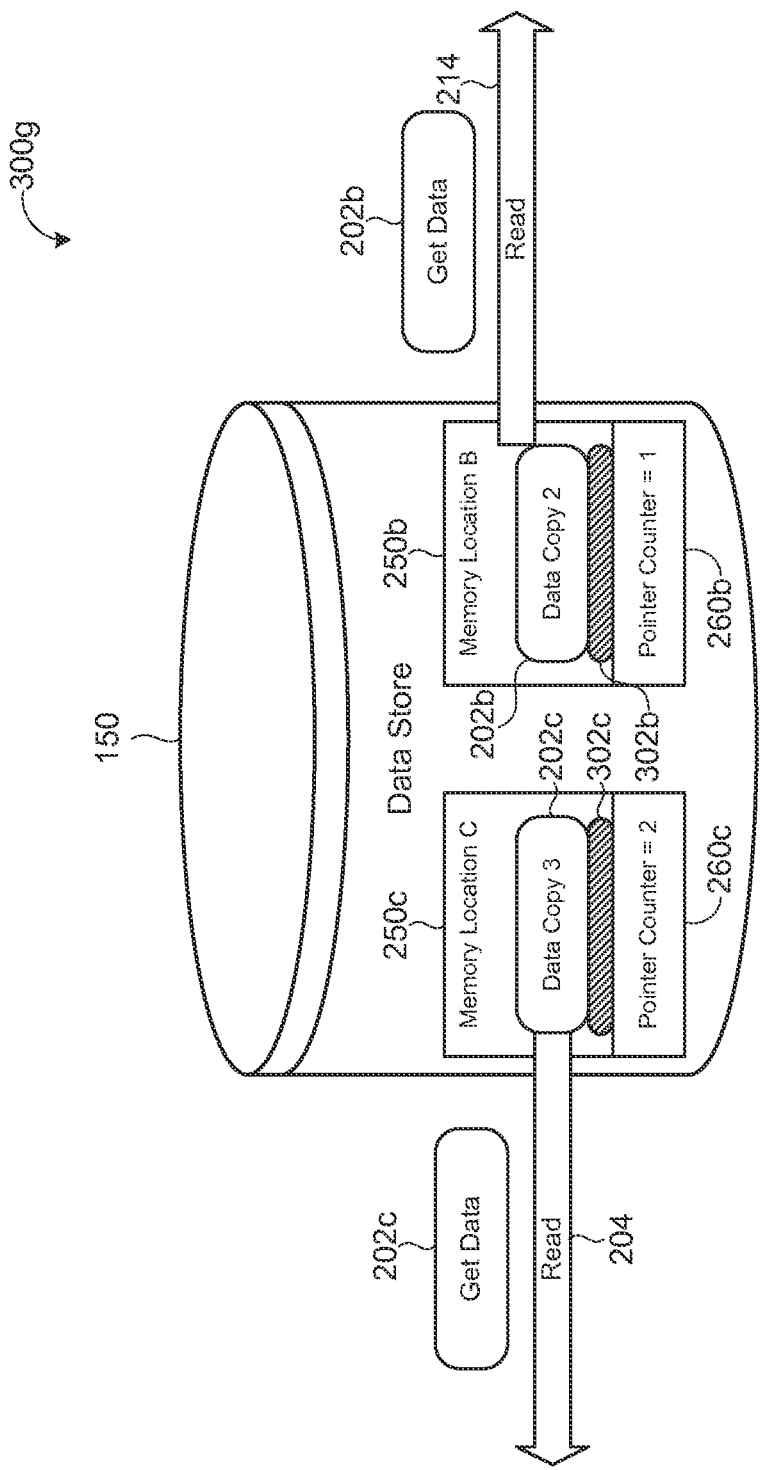

Referring to FIG. 3G, a subsequent read transaction 214 executes on the third memory location 250c to get the data 202c corresponding to the updated copy of data ("Data Copy 3) 202c put by the write transaction 204 shown in FIG. 3C. The third pointer counter 260c associated with the third memory location 250c is incremented for the subsequent executing read transaction 214. In the example shown, the third pointer counter 260c is two. The second pointer counter 260b associated with the second memory location remains one while the read transaction 214 executing on the second memory location 250b shown in FIG. 3F is still in progress.

Figure 3H:
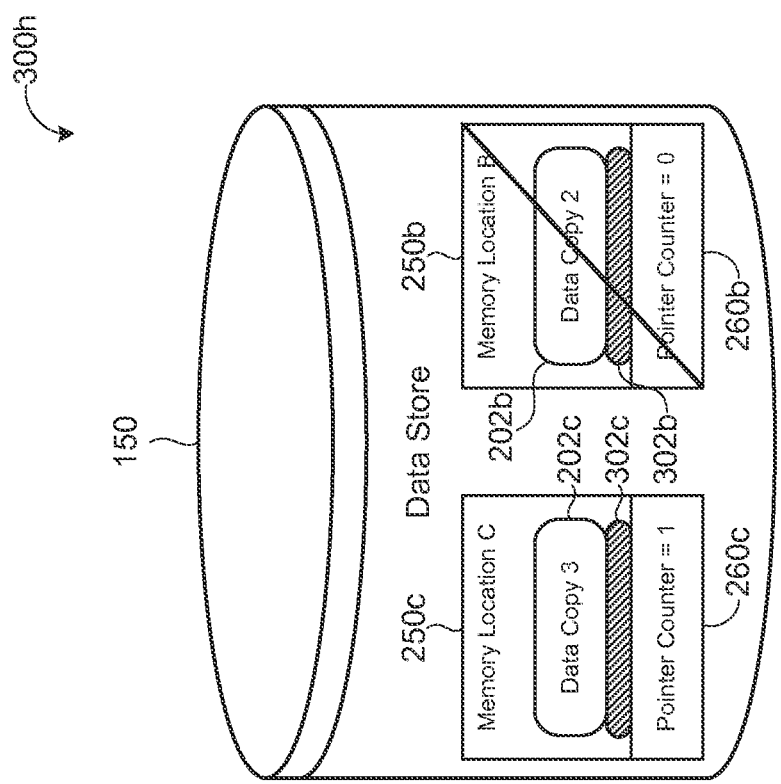

FIG. 3H shows the second pointer counter 260b associated with the second memory location 250b decrementing to zero after completion of the read transaction 214 on the second memory location 250b illustrated FIG. 3G resulting in the computing device 112 de-allocating the second memory location 250b. The third pointer counter 260c referencing the third memory location 250c decrements to one after completion of the read transaction 214 on the third memory location 350c illustrated in FIG. 3G.

Figure 4:
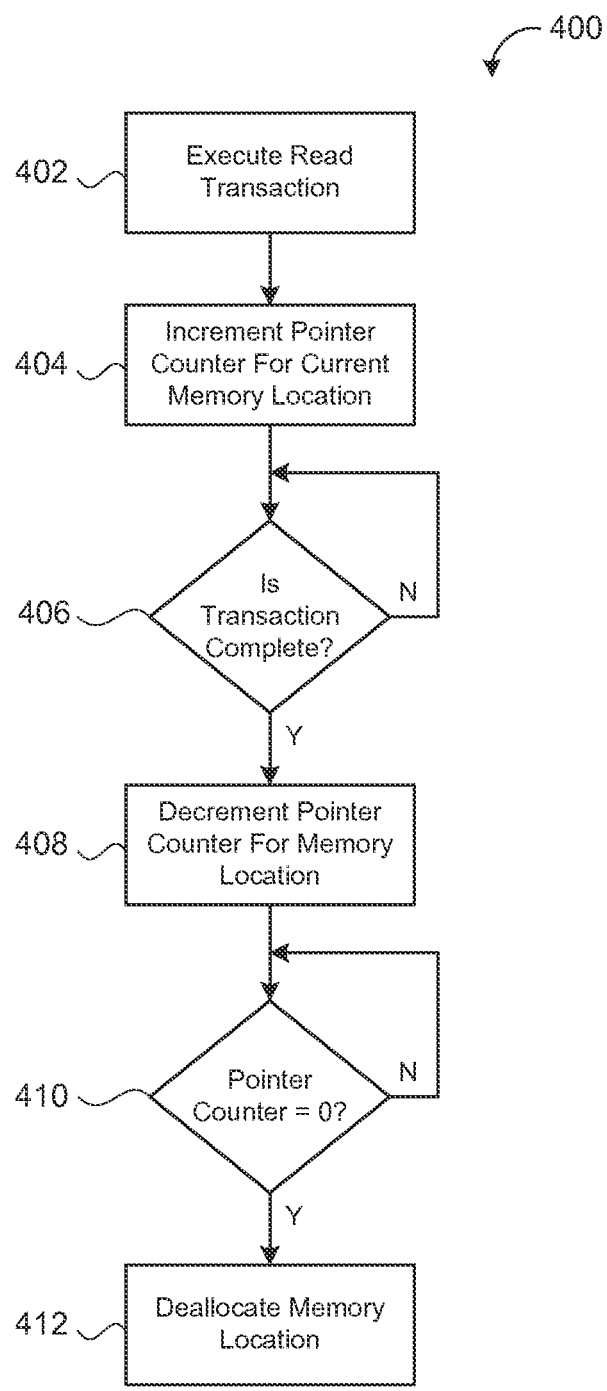
FIG. 4 is an exemplary flowchart for executing a read transaction.

FIG. 4 is a flowchart 400 of example operations performed by the computing device 112 of the distributed storage system 200 of FIG. 2 when executing a read transaction 214. The flowchart 400 starts at operation 402 where the computing device 112 executes the read transaction 214 on a memory location 250 to get the data 202. In some implementations, the computing device 112 executes the read transaction 214 in response to receiving a read access request 130 through a network 132 from a transaction API 124 executing on a user device 120 to get the data 202 from the non-transitory data store 150.

In some examples, when the read access request 130 is received while a write transaction 204 is currently executing on a subsequent memory location 250 to update the data 202, the computing device 112 may block the read transaction 214 from getting data 202 not including the update and require the read transaction 214 to wait before executing on the new memory location 250 to get the updated data 202 until completion of the write transaction 204 if a remaining number of memory cycles (e.g., status indicator 302 of FIGS. 3A-3H) until completion of the write transaction 204 is less than a memory cycle threshold. In this example, the computing device 112 beneficially gets the updated data 202 while only requiring a short delay time (less than the memory cycle threshold) before executing the read transaction 214 to get the updated data 202.

At operation 404, a pointer counter 260 associated with the memory location 250 where the read transaction 214 executes is incremented, as illustrated in FIG. 3B. In some examples, the computing device 112 blocks write access to the associated memory location upon executing the read transaction 214 upon the associated memory location 250. At operation 406, the computing device 112 decides whether or not the read transaction 204 is complete. If the read transaction 214 is not complete ("N") then the flowchart 400 reverts back to—and repeats—operation 404. When the read transaction 214 is completes ("Y") the flowchart 400 proceeds to operation 408 where the pointer counter 260 is decremented, as illustrated in FIG. 3F.

At operation 410, the computing device 112 decides whether or not the pointer counter 260 associated with the memory location is zero. If the pointer counter 260 is not zero ("N"), then the flowchart 400 reverts back to—and repeats—operation 410. When the pointer counter 260 is zero ("Y") the flowchart 400 proceeds to operation 412 where the memory location 250 is de-allocated by the computing device 112, as illustrated in FIGS. 3C and 3H.

Figure 5:
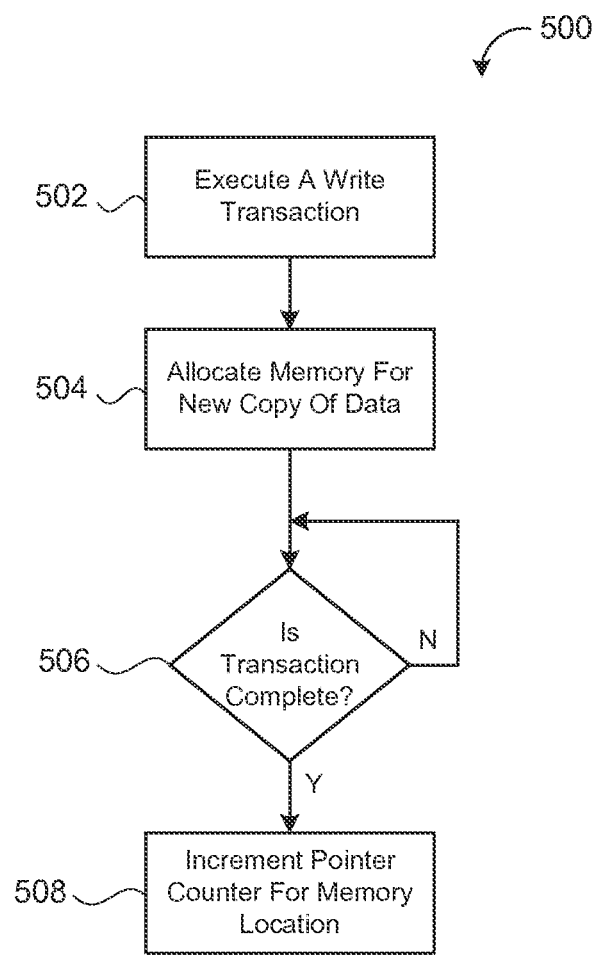
FIG. 5 is an exemplary flowchart for executing a write transaction.

FIG. 5 is a flowchart 500 of example operations performed by the computing device 112 of the distributed storage system 200 of FIG. 2 when executing a write transaction 204. The flowchart 500 starts at operation 502 where the computing device 112 executes the write transaction 204 to write data 202 to the non-transitory data store 150. In some implementations, the computing device 112 executes the write transaction 204 in response to receiving a write access request 128 through a network 132 from a transaction API 124 executing on a user device 120 to put the data 202 into the non-transitory data store 150. At operation 504, the computing device 112 allocates a memory location 250 in the non-transitory data store, as illustrated in FIG. 3B. In some implementations, a pointer counter 260 associated with the allocated memory location 250 is initialized.

At operation 506, the computing device 112 decides whether or not the write transaction 204 is complete. If the write transaction 204 has not completed, then the flowchart 400 reverts back to—and repeats—operation 506. The flowchart 500 proceeds to operation 508 after completion of the write transaction 204 where the computing device 112 increments the pointer counter 260 for the associated memory location 250, as illustrated in FIG. 3C. In some examples, the computing device 112 may simultaneously decrement another pointer counter 260 associated with a memory location permitting read access to a prior copy of the data 202.

Figure 6:
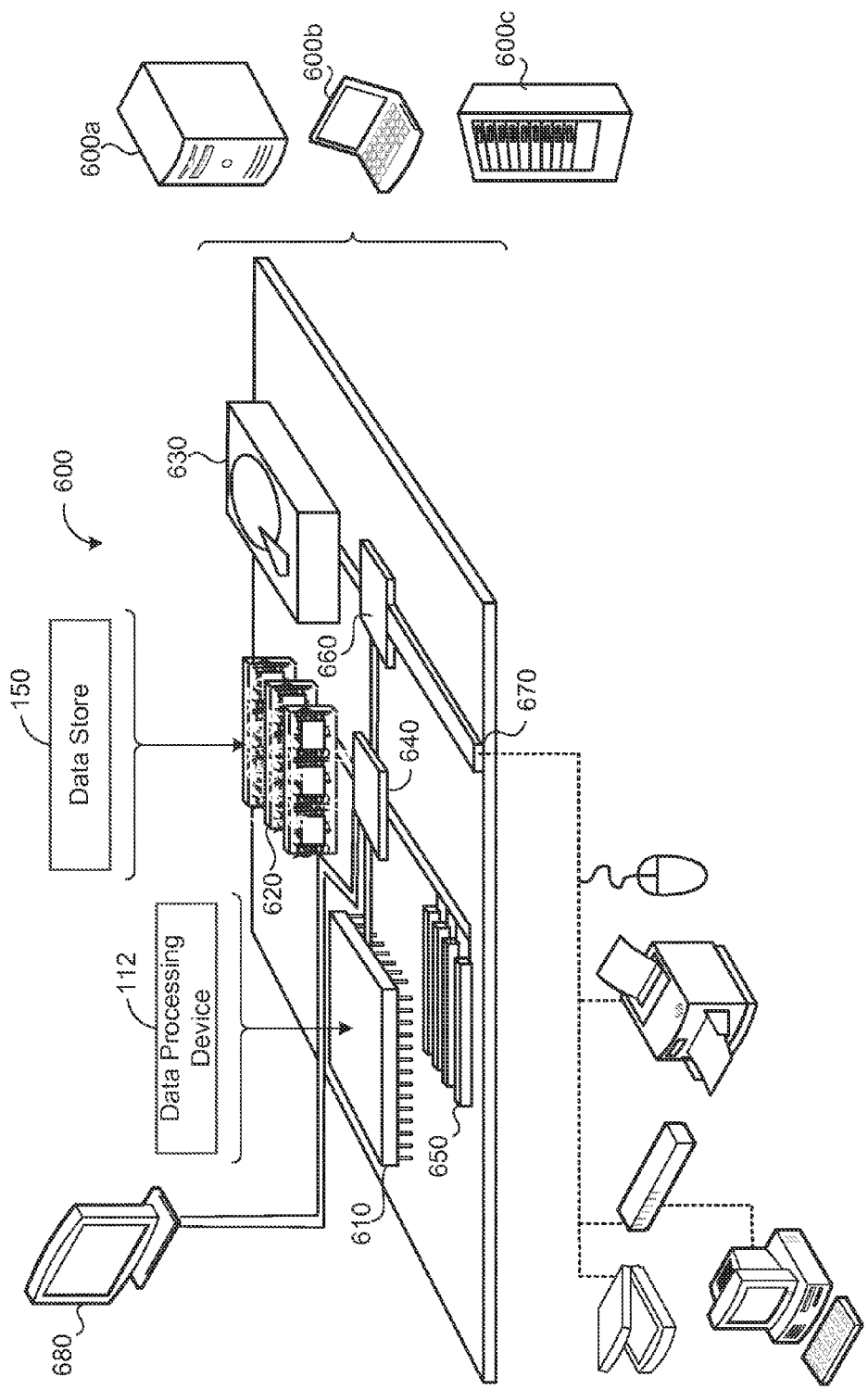
FIG. 6 is a schematic view of an example computing device in communication with a non-transitory data store.

FIG. 6 is a schematic view of an example computing device 600 that may be used to implement the systems and methods described in this document, such as the computing resource 112 and the non-transitory data store 150. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (i.e., data processing device), memory 620, a storage device 630, a high-speed interface/controller 640 connecting to the memory 620 and high-speed expansion ports 650, and a low speed interface/controller 660 connecting to a low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a GUI on an external input/output device, such as a display 680 coupled to a high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

In some implementations, the computing device 600 implementing the computing resource(s) 112 is in communication with data store 150 (e.g., in the memory 620). The computing resource 112 (executing on the data processing device 610) executes the write and read transactions 204, 214, respectively, allocates memory locations 250a-n in the non-transitory data store 150, increments and decrements pointer counters 260a-n associated with the memory locations 250a-n, and de-allocates memory locations 250a-n when the associated pointer counters 260a-n decrement to zero. For example, the computing resource 112 may receive a write access request 128 (or a read access request 130) from a user device 120, execute a write transaction 204 (or a read transaction 214) on the data store 150, allocate a memory location 250 in the data store 150, and write data 202 to the memory location 250. In some examples, the computing resource 112 initializes a pointer counter 260 associated with the memory location 250 when the write transaction executes and increments the pointer counter 260 upon completion of the write transaction 204. For instance, the pointer counter 260 is equal to zero upon initializing and increments to one upon completion of the write transaction 204 executing on the associated memory location 250a-n. In other examples, the computing resource 112 executes one or more read transactions 214 on the memory location 250 after completion of the write transaction 204 and increments the pointer counter for each read transaction 214 executing on the memory location 250 to get the data 202. In some examples, the computing resource 112 decrements the pointer counter 260 after completion of each read transaction 214 executing on the memory location 250. In some examples, when updating the data 202, the computing resource 112 executes a subsequent second write transaction 204 on the data store 150 to update the data 202, allocates a subsequent second memory location 250 in the data store 150, and writes updated data 202 to the subsequent second memory location 250 and initializes a subsequent second pointer counter 260 associated with the subsequent second memory location 250. While the subsequent second pointer counter 260 is zero, the computing resource 112 may execute one or more subsequent read transactions 214 on the memory location 250 to get the data 202 (un-updated data 202) while the subsequent second write transaction 204 concurrently executes on the subsequent second memory location 250. Upon completion of the second write transaction 204, the computing resource 112 decrements the pointer counter associated with the memory location 250 (that includes the data 202) and increments a subsequent second pointer counter associated with the subsequent second memory location 250 (that includes the updated data 202) upon completion of the subsequent second write transaction 204. Accordingly, when the subsequent second pointer counter 260 is greater than zero, the computing resource 112 may execute one or more subsequent read transactions 214 on the subsequent second memory location 250 to get the updated data 204. In some examples, the computing resource 112 de-allocates the memory location 250 when the pointer counter 260 associated with the memory location 250 decrements to zero.

In some examples, the computing resource 112 blocks read access to a memory location 250 when an associated pointer counter 260 is zero, wherein the pointer counter 260 is zero when a write transaction 204 executing on the associated memory location is in progress. In other examples, the computing resource 112 blocks write access to a memory location 250 upon executing a read transaction 214 upon the associated memory location 250.

A software application (i.e., a software resource 110s) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory 110hm may be physical devices used to store programs (e.g., sequences of instructions) or data (e.g., program state information) on a temporary or permanent basis for use by a computing device 110hc. The non-transitory memory 110hm may be volatile and/or non-volatile addressable semiconductor memory. Examples of non-volatile memory include, but are not limited to, flash memory and read-only memory (ROM)/ programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
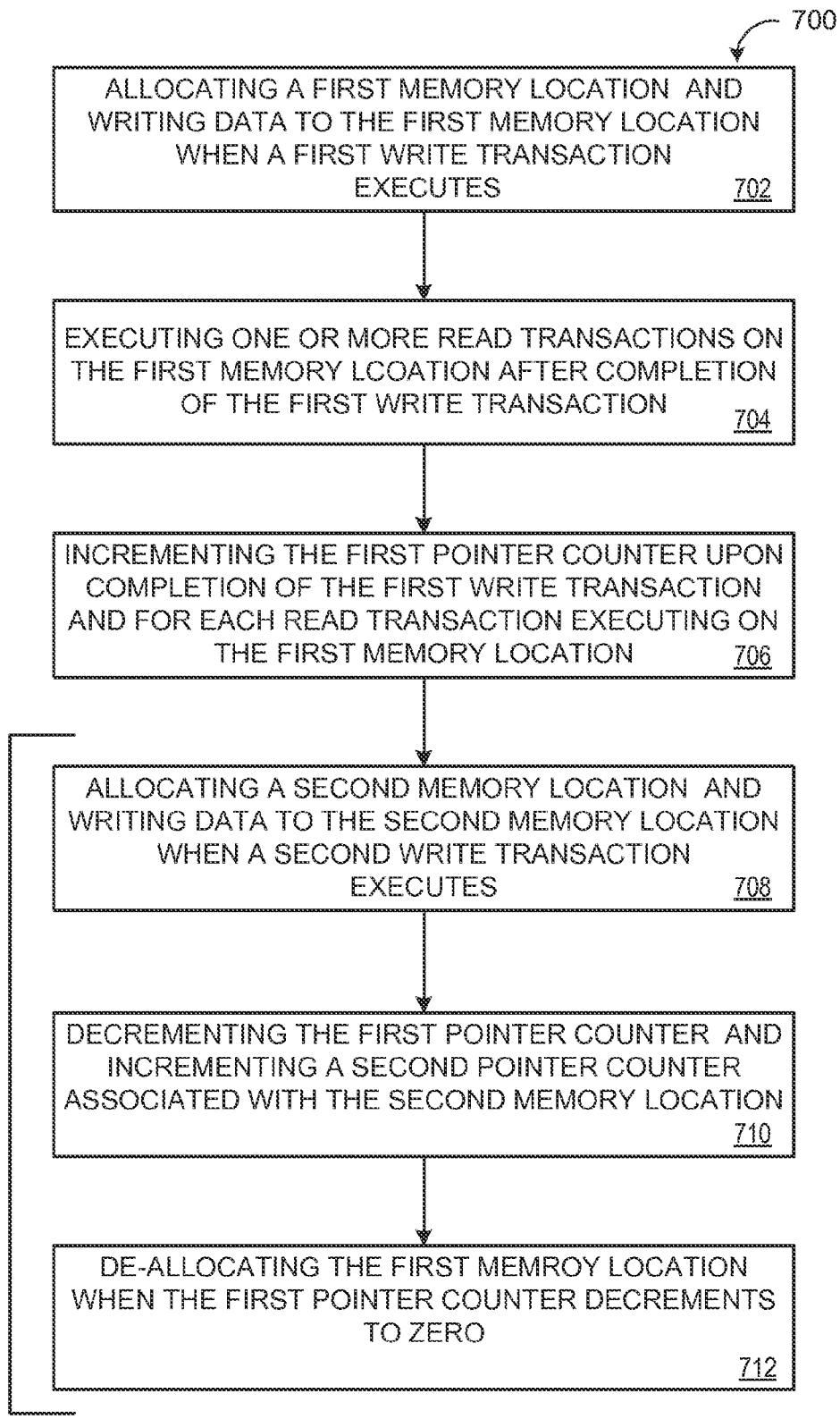
FIG. 7 is a flowchart of an example method for executing write and read transactions on a non-transitory data store using the computing device of FIG. 6.

FIG. 7 is a flowchart of an example method 700 executed by the computing device 600 of FIG. 6 for executing write and read transactions 204, 214, respectively, on the non-transitory data store 150. The flowchart starts at operation 702 where the data processing device 112 (executing the computing device 112) allocates a first memory location 250a in the non-transitory data store 150 and writes data 202a to the first memory location 250a when a first write transaction 204 executes. The first write transaction 204 may execute when the computing device 112 receives a write access request 128 from a transaction API 124 executing on a user device 120. In some implementations, the computing device 112 initializes a first pointer counter 260a associated with the first memory location 250a and blocks read access to the first memory location 250a when the first pointer counter 260a is zero while the first write transaction 204 executing on the first memory location 250a is in progress. At operation 704, the computing device 112 executes one or more read transactions 214 on the first memory location 250a to get the data 202a after completion of the first write transaction 204, as illustrated in FIG. 3B. In some examples, the computing device 112 blocks subsequent write access to the first memory location 250a. In some implementations, a read transaction 214 executes when the computing device 112 receives a read access request 130 from a transaction API 124 executing on the user devices 120.

At operation 706, the computing device 112 increments the first pointer counter 260a upon completion of the first write transaction 204 and for each read transaction 214 executing on the first memory location 250a, as illustrated in FIG. 3B. The flowchart proceeds to operation 708 where the computing device(s) 112 allocates a second memory location 250b in the non-transitory data store 150 and writes updated data 202b to the second memory location 250b when a second write transaction 204 executes on the non-transitory data store 150 to update the data 202b, as illustrated in FIG. 3B. In some implementations, the computing device 112 initializes a second pointer counter 260b associated with the second memory location 250b and blocks read access to the second memory location 250b when the second pointer counter 260b is zero while the second write transaction 204 executing on the second memory location 250b is in progress. At operation 710, the computing device 112 decrements the first pointer counter 260a associated with the first memory location 250a and increments the second pointer counter 260b associated with the second memory location 250b upon completion of the second write transaction 204, as illustrated in FIG. 3C. In some implementations, the computing device 112 decrements a pointer counter 260 associated with a memory location 250 for each read transaction 215 on the associated memory location 250 that completes. In some examples, when the first pointer counter 260a associated with the first memory location 250a is greater than zero after the second pointer counter 260b increments, the computing device 112 permits any read transactions 214 executing on the first memory location 250a already in progress to complete. However, any subsequent read transactions 214 will execute on the second memory location 204b to get the updated data 202b, as illustrated in FIG. 3D. At operation 712, the computing device 112 de-allocates the first memory location 250a when the first pointer counter 260a decrements to zero, as illustrated in FIG. 3D.

In some implementations, the computing device 112 recursively performs the operations 708-712 as the data 202 is continuously updated. For example, when a subsequent third write transaction 214 executes on the data store 150 to update the data 202 again, the computing resource 112 will allocate a third memory location 250c in the data store 150, initialize a third pointer counter 260c associated with the third memory location 250c, and write the updated data 202 to the third memory location 250c. Similar to operation 710 discussed above with respect to the second write transaction 204, the computing device 112 increments the third pointer counter 260c and decrements the second pointer counter 260b associated with the second memory location 250b upon completion of the third write transaction 204. Thereafter, the computing resource 112 de-allocates the second memory location 250b when the second pointer counter 260b associated with the second memory location 250b decrements to zero.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   when a first write transaction executes on a non-transitory data store:
      allocating, by a computing device in communication with the non-transitory data store, a first memory location in the non-transitory data store; and
      writing data, by the computing device, to the first memory location;
   executing, by the computing device, one or more read transactions on the first memory location after completion of the first write transaction;
   incrementing, by the computing device, a first pointer counter associated with the first memory location upon completion of the first write transaction and for each read transaction executing on the first memory location to get the data;
   when a second write transaction executes on the non-transitory data store to update the data:
      allocating, by the computing device, a second memory location in the non-transitory data store; and
      writing updated data, by the computing device, to the second memory location;
   after completion of the second write transaction, the computing device:
      decrementing the first pointer counter associated with the first memory location; and
      incrementing a second pointer counter associated with the second memory location; and
   de-allocating the first memory location, by the computing device, when the first pointer counter associated with the first memory location decrements to zero.

2. The method of claim 1, further comprising blocking read access, by the computing device, to a memory location when a pointer counter associated with the memory location is zero.

3. The method of claim 2, wherein the pointer counter is zero when a write transaction executing on the associated memory location is in progress.

4. The method of claim 1, further comprising upon executing a read transaction on a memory location to get data, blocking write access, by the computing device, to the associated memory location.

5. The method of claim 1, further comprising decrementing, by the computing device, a pointer counter associated with a memory location after completion of a read transaction on the associated memory location.

6. The method of claim 1, further comprising, when the second pointer counter associated with the second memory location is zero, executing, by the computing device, one or more subsequent read transactions on the first memory location to get the data while the second write transaction concurrently executes on the second memory location.

7. The method of claim 1, further comprising, when the second pointer counter associated with the second memory location is greater than zero, executing, by the computing device, one or more subsequent read transactions on the second memory location to get the updated data.

8. The method of claim 1, further comprising, when the first pointer counter associated with the first memory location is greater than zero after the second pointer counter associated with the second memory location increments, permitting, by the computing device, any read transactions executing on the first memory location in progress to complete.

9. The method of claim 1, further comprising, when a remaining number of memory cycles until completion of the second write transaction is less than a memory cycle threshold:
blocking one or more subsequent read transactions, by the computing device, from executing on the first memory location to get the data; and
delaying the one or more subsequent read transactions, by the computing device, from executing on the second memory location to get the updated data until completion of the second write transaction.

10. The method of claim 1, further comprising, upon allocating a memory location, initializing, by the computing device, a pointer counter associated with the memory location.

11. The method of claim 1, further comprising incrementing, by the computing device, a pointer counter associated with a memory location for each read transaction executing on the associated memory location.

12. The method of claim 1, further comprising, when a third write transaction executes on the non-transitory data store to update the data after completion of the second write transaction:
allocating, by the computing device, a third memory location in the non-transitory data store;
writing updated data, by the computing device, to the third memory location;
upon completion of the third write transaction, the computing device:
decrementing the second pointer counter associated with the second memory location; and
incrementing a third pointer counter associated with the third memory location; and
de-allocating, by the computing device, the second memory location when the second pointer counter associated with the second memory location decrements to zero.

13. The method of claim 1, further comprising executing a write transaction on the non-transitory data store when the computing device receives a write access request from an application programming interface executing on a user device.

14. The method of claim 1, further comprising executing a read transaction on the non-transitory data store when the computing device receives a read access request from an application programming interface executing on a user device.

15. The method of claim 1, wherein the non-transitory data store comprises a hierarchal structure for storing the data, the data comprising strongly-typed data.

16. A remote system comprising:
a non-transitory data store;
a data processing device in communication with the non-transitory data store, the data processing device:
when a first write transaction executes on the non-transitory data store, allocating a first memory location in the non-transitory data store and writing data to the first memory location;
executing one or more read transactions on the first memory location after completion of the first write transaction;
incrementing a first pointer counter associated with the first memory location upon completion of the first write transaction and for each read transaction executing on the first memory location to get the data;
when a second write transaction executes on the non-transitory data store to update the data, allocating a second memory location in the non-transitory data store and writing updated data to the second memory location;
upon completion of the second write transaction, decrementing the first pointer counter associated with the first memory location and incrementing a second pointer counter associated with the second memory location; and
de-allocating the first memory location when the first pointer counter associated with the first memory location decrements to zero.

17. The system of claim 16, wherein the data processing device blocks read access to a memory location when a pointer counter associated with the memory location is zero.

18. The system of claim 17, wherein the pointer counter is zero when a write transaction executing on the associated memory location is in progress.

19. The system of claim 16, wherein the data processing device blocks write access to a memory location upon executing a read transaction on the associated memory location to get the data.

20. The system of claim 16, wherein the data processing device decrements a pointer counter associated with a memory location after completion of a read transaction on the associated memory location.

21. The system of claim 16, wherein the data processing device executes, when the second pointer counter associated with the second memory location is zero, one or more subsequent read transactions on the first memory location to get the data while the second write transaction concurrently executes on the second memory location.

22. The system of claim 16, wherein the data processing device executes, when the second pointer counter associated with the second memory location is greater than zero, one or more subsequent read transactions on the second memory location to get the updated data.

23. The system of claim 16, wherein the data processing device permits, when the first pointer counter associated with the first memory location is greater than zero after the second pointer counter associated with the second memory location increments, any read transactions executing on the first memory location in progress to complete.

24. The system of claim 16, wherein the data processing device, when a remaining number of memory cycles until completion of the second write transaction is less than a memory cycle threshold:

blocks one or more subsequent read transactions from executing on the first memory location to get the data; and delays the one or more subsequent read transactions from executing on the second memory location to get the updated data until completion of the second write transaction.

25. The system of claim 16, wherein the data processing device initializes a pointer counter associated with a memory location upon allocating the associated memory location.

26. The system of claim 16, wherein the data processing device increments a pointer counter associated with a memory location for each read transaction executing on the associated memory location.

27. The system of claim 16, wherein the data processing device:

when a third write transaction executes on the non-transitory data store to update the data after completion of the second write transaction, allocates a third memory location in the non-transitory data store and writes updated data to the third memory location;

upon completion of the third write transaction, decrements the second pointer counter associated with the second memory location and increments a third pointer counter associated with the third memory location; and de-allocates the second memory location when the second pointer counter associated with the second memory location decrements to zero.

28. The system of claim 16, wherein the data processing device executes a write transaction on the non-transitory data store when the data processing device receives a write access request from an application programming interface executing on a user device.

29. The system of claim 16, wherein the data processing device executes a read transaction on the non-transitory data store when the data processing device receives a read access request from an application programming interface executing on a user device.

30. The system of claim 16, wherein the non-transitory data store comprises a hierarchal structure for storing the data, the data comprising strongly-typed data.

* * * * *